C. F. Walker,
Horse Rake.
No. 36,043.  Patented July 29, 1862.
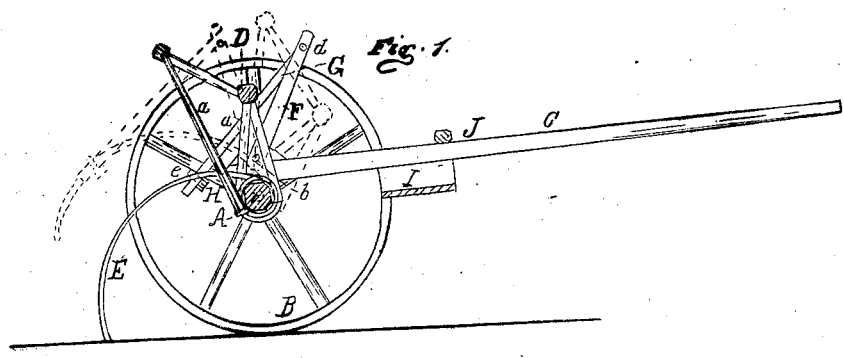
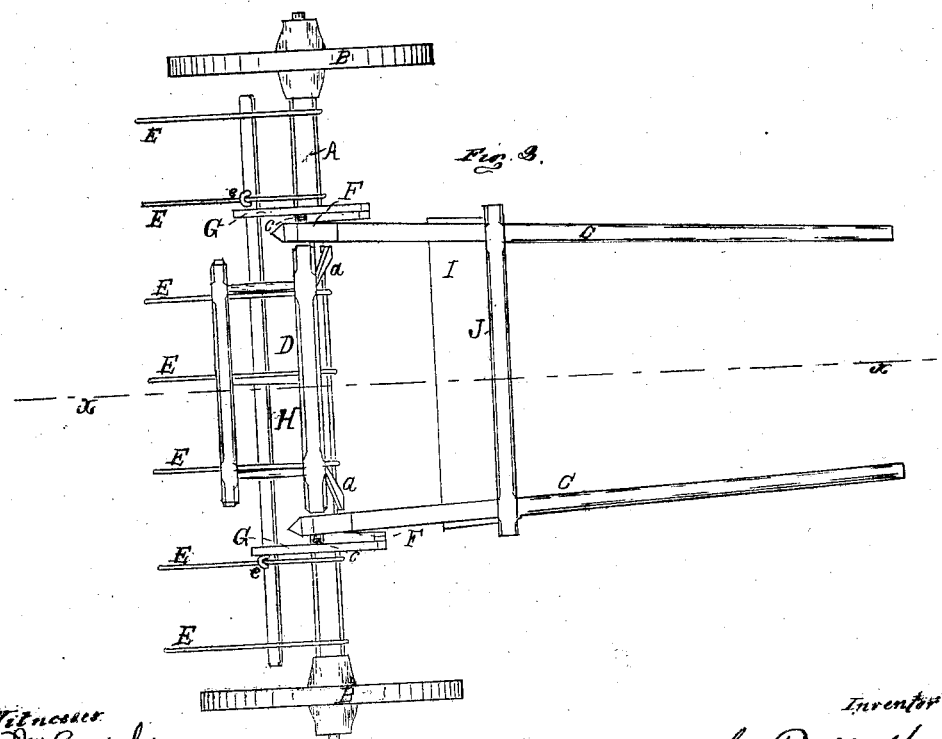

UNITED STATES PATENT OFFICE.

C. F. WALKER, OF BENFORD'S STORE, PENNSYLVANIA.

IMPROVEMENT IN HORSE-RAKES.

Specification forming part of Letters Patent No. 36,043, dated July 29, 1862.

*To all whom it may concern:*

Be it known that I, C. F. WALKER, of Benford's Store, in the county of Somerset and State of Pennsylvania, have invented a new and Improved Horse-Rake; and I do hereby declare that the following is a full, clear, and exact description of the same, reference being had to the accompanying drawings, making a part of this specification, in which—

Figure 1 is a side sectional view of my invention, taken in the line $x\ x$, Fig. 2. Fig. 2 is a plan or top view of the same.

Similar letters of reference indicate corresponding parts in the two figures.

The object of this invention is to obtain a simple and efficient horse-rake, which may be constructed at a small cost and by any one of ordinary ability familiar with mechanics' tools, and at the same time be capable of being operated—that is to say, have its teeth raised and lowered for the purpose of discharging the load and adjusting them again in proper working position with the greatest facility.

To this end the invention consists in having the driver's seat attached directly to the axle of the wheels, the latter being placed loosely on the former and the teeth attached directly to the axle, and the axle connected to a clearer, all being combined and arranged in such a manner that the driver may, simply by the movement of his seat, operate the teeth and the clearer.

To enable those skilled in the art to fully understand and construct my invention, I will proceed to describe it.

A represents an axle, which has its wheels B B placed loosely on it; and C C are thills, which are connected to the axle by straps or clips, in which the axle is allowed to turn freely.

D represents the driver's seat, which is permanently secured to the axle A by proper supports $a$. The axle A has a series of curved wire teeth, E, attached to it. These teeth are of the usual form, and may be attached to the axle so as to have one or more convolutions around it to give them a requisite degree of elasticity.

To the back parts of the thill C, at their outer sides, and at points directly over the axle, there are attached by fulcrum-pins $b$ levers F, one to each thill. The lower ends of these levers are connected by staples $c$ with the axle A, and the upper ends of the levers are connected by pivots $d$ to the inner ends of arms G G, the outer or back ends of which are permanently attached to a bar, H, which is parallel with the axle A and directly underneath the teeth E, or at their inner sides, the bar being connected to two of the teeth E, one near each end, by staples $e$, both of which are shown in Fig. 2.

To the back part of the thills C C there are attached a foot-board, I, and a cross-bar, J.

The operation is as follows: When the machine is being drawn along, and the driver's seat D is in an upright position, the ends of the teeth E will be in contact with the surface of the ground and in a working position, so as to rake up the hay or straw which may lie in their path, and the seat is thus retained by the driver upon it without any special exertion on his part, an upright position of the body being only required to effect that result. When the teeth of the rake are filled, or, in other words, have gathered a load, the driver, by a slight inclination of his body forward, moves forward the seat, and thereby turns the axle A and raises the teeth E, as shown in red, Fig. 1, and causes the load to be discharged. Simultaneously with the moving upward of the teeth E the bar H is forced back, the movement of said bar being due to the levers F and arms G G, the levers F being actuated by the turning of the axle. This movement of bar H clears the teeth and insures the proper discharge of the load. After the load is discharged and the driver assumes an erect position on his seat, and thereby throws back the seat D and turns the axle so that the teeth E will fall again in working position, the bar H moving back simultaneously with the downward movement of the teeth, said bar, when the teeth are fully down, being in close proximity to the axle A. Thus by this simple arrangement it will be seen that the teeth may be raised and lowered with the greatest facility, and also the clearer or bar H, both being moved simultaneously and without the aid of any special device other than those connected with the seat D.

This invention may be constructed at a small cost. An axle and wheels of an ordinary old vehicle will admit of being readily converted into a rake like the one described.

Having thus described my invention, what I claim as new, and desire to secure by Letters Patent, is—

1. The combination of the axle A, teeth E, thills C C, and seat D, when arranged to operate as and for the purpose set forth.

2. The bar or clearer H, when connected to the axle A and thills C C, and arranged to operate by the movement of the seat D in conjunction with the teeth E, as and for the purpose set forth.

C. F. WALKER.

Witnesses:
JOHN LOTTIG,
JOSIAH MOWRY.